United States Patent
Good et al.

(10) Patent No.: US 6,285,492 B1
(45) Date of Patent: *Sep. 4, 2001

(54) INTERACTIVE ELECTROCHEMICAL DISPLAYS

(75) Inventors: David M. Good, Peachtree City, GA (US); Chauncey T. Mitchell, Jr., Lakeland, TN (US); Mark A. Shadle, Peachtree City, GA (US); Gerrit L. Verschuur, Lakeland, TN (US); Robert Parker, Bend, OR (US)

(73) Assignee: Timer Technologies, LLC, Algoma, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/340,235

(22) Filed: Jul. 1, 1999

Related U.S. Application Data
(60) Provisional application No. 60/091,601, filed on Jul. 2, 1998.

(51) Int. Cl.[7] .............................. G02B 26/00; H01M 6/30
(52) U.S. Cl. ........................ 359/297; 429/110; 429/124; 429/8; 429/90
(58) Field of Search ................... 429/8, 90, 92, 429/67, 110, 124; 324/425, 435, 444; 430/13; 361/500; 204/225, 224; 359/297

(56) References Cited

U.S. PATENT DOCUMENTS

| | | | |
|---|---|---|---|
| 2,688,649 | 9/1954 | Bjorksten | 429/124 |
| 3,006,980 | 10/1961 | Story | 429/124 |
| 3,045,179 | 7/1962 | Maier | 368/114 |
| 3,209,255 | 9/1965 | Estes et al. | 329/194 |
| 3,230,115 | 1/1966 | Tamminen | 429/124 |
| 3,607,430 | 9/1971 | Glover | 29/263.2 |
| 3,891,457 | 6/1975 | Auborn | 429/104 |
| 3,940,205 | 2/1976 | Crandall et al. | 359/267 |
| 4,120,568 | 10/1978 | Deb et al. | 359/274 |
| 4,153,345 | 5/1979 | Duchene et al. | 359/297 |
| 4,161,815 | 7/1979 | Land et al. | 29/623.4 |
| 4,331,386 | 5/1982 | Minami | 359/274 |
| 4,356,818 | 11/1982 | Macias et al. | 128/886 |
| 4,382,700 | 5/1983 | Youngren | 374/102 |
| 4,408,557 | 10/1983 | Bradley et al. | 116/206 |
| 4,418,129 | 11/1983 | Goebel | 429/91 |
| 4,539,275 | 9/1985 | Plasse | 429/152 |
| 4,561,729 | 12/1985 | Heinz et al. | 359/269 |
| 4,614,695 | 9/1986 | Ibbott | 429/127 |
| 4,664,993 | 5/1987 | Sturgis et al. | 429/178 |
| 4,703,754 | 11/1987 | Ibbott | 607/144 |
| 4,804,275 | 2/1989 | Kang et al. | 374/162 |
| 4,876,441 | 10/1989 | Hara et al. | 235/488 |
| 4,977,046 | 12/1990 | Bleszinski, Jr. et al. | 429/224 |
| 5,035,965 | 7/1991 | Sangyoki et al. | 429/124 |
| 5,055,968 | 10/1991 | Nishi et al. | 361/737 |
| 5,147,985 | 9/1992 | DuBrucq | 174/260 |
| 5,197,958 | 3/1993 | Howell | 604/361 |
| 5,225,291 | 7/1993 | Rao | 429/51 |
| 5,250,905 | 10/1993 | Kuo et al. | 324/435 |
| 5,264,830 | 11/1993 | Kline et al. | 340/604 |

(List continued on next page.)

FOREIGN PATENT DOCUMENTS

| | | |
|---|---|---|
| 0 638 952 A1 | 2/1995 | (EP) . |
| WO93/06474A1 | 4/1993 | (WO) . |

Primary Examiner—Evelyn A Lester
(74) Attorney, Agent, or Firm—Eugene Stephens & Associates; Thomas B. Ryan

(57) ABSTRACT

Electrochemical displays have electronic or ionic pathways between electrodes interrupted to control activation. Electrochemical erosion of one of the electrodes reveals an underlying graphic image. Game assemblies are constructed by dividing electrochemical components between a main substrate and one or more mounting pieces that can be assembled on the main substrate to activate the display cells.

73 Claims, 14 Drawing Sheets

U.S. PATENT DOCUMENTS

| | | | |
|---|---|---|---|
| 5,339,024 | 8/1994 | Kuo et al. | 324/435 |
| 5,350,645 | 9/1994 | Lake et al. | 429/124 |
| 5,354,289 | 10/1994 | Mitchell et al. | 604/361 |
| 5,396,177 | 3/1995 | Kuo et al. | 324/435 |
| 5,418,086 | 5/1995 | Bailey | 429/93 |
| 5,495,250 | 2/1996 | Ghaem et al. | 342/51 |
| 5,500,759 | 3/1996 | Coleman | 359/270 |
| 5,516,598 | 5/1996 | Visco et al. | 429/142 |
| 5,523,179 | 6/1996 | Chu | 429/104 |
| 5,532,077 | 7/1996 | Chu | 429/102 |
| 5,542,959 | 8/1996 | Tuttle | 29/623.3 |
| 5,563,002 | 10/1996 | Harshe | 429/7 |
| 5,582,623 | 12/1996 | Chu | 29/623.1 |
| 5,614,586 | 3/1997 | Tang et al. | 524/817 |
| 5,627,472 | 5/1997 | Ofer et al. | 324/435 |
| 5,635,312 | 6/1997 | Yanagisawa et al. | 429/94 |
| 5,637,418 | 6/1997 | Brown et al. | 429/127 |
| 5,652,043 | 7/1997 | Nitzan | 428/209 |
| 5,656,393 | 8/1997 | Boer et al. | 429/217 |
| 5,763,058 | 6/1998 | Isen et al. | 428/209 |
| 5,912,759 | 6/1999 | Good et al. | 359/297 |
| 5,930,023 | 7/1999 | Mitchell, Jr. et al. | 359/270 |
| 6,136,468 * | 10/2000 | Mitchell, Jr. et al. | 429/110 |

* cited by examiner

INTERACTIVE ELECTROCHEMICAL DISPLAYS

This application claims the benefit of U.S. Provisional Application No. 60/091,601, filed on Jul. 2, 1998, which provisional application is incorporated by reference herein.

TECHNICAL FIELD

The invention contemplates electrochemical displays having means of activation subject to predetermined interactions, which preferably involve elements of choice or participation. The displays are also preferably self-powered, irreversible, low-cost, formed in layers, and printable on an in-line press.

BACKGROUND

Electrochemical displays can be arranged to form predetermined graphic images or to reveal previously formed images that have been blocked from sight. Sometimes, the rate of image formation or revelation is controlled to provide a timing or other measuring function. The graphic images can take a variety of forms from a patch of color to text, patterns, or pictures.

The displays generally include two electrodes, an electrolyte, and an electronic conductor between the two electrodes. The electrolyte provides an ionically conductive pathway between the electrodes, and the conductor provides an electronically conductive pathway between the electrodes. Voltaic display cells have electrodes with different electrode potentials. Completing both the pathways (ionic and electronic) between the different electrodes triggers an electrochemical reaction that produces visible changes in the displays. Electrolytic display cells have electrodes with equal electrode potentials, but similar electrochemical reactions can be started by imposing electrical potentials across the two electrodes from external power sources.

Activation of electrolytic display cells can be controlled by single or double pole switches that interrupt the flow of current to the electrodes or that change its direction. For example, U.S. Pat. No. 4,153,345 to Duchene et al. discloses an electrolytic display cell in which a pattern of thin metal film is alternately dissolved into a liquid electrolyte and redeposited onto conductive portions of a transparent electrode. The polarity of an external power source controls whether the display undergoes dissolution or deposition. Electrolytic cells can also be connected to external power sources for monitoring the condition of external sources. For example, U.S. Pat. No. 5,418,086 to Bailey discloses an electrolytic-type battery charge indicator powered by the monitored battery. One electrode is dissolved and redeposited onto another electrode as an indication of battery usage.

Activation of voltaic cells can be controlled by interrupting either the ionically conductive pathway or the electronic conductive pathway between electrodes. For example, U.S. Pat. No. 4,894,275 to Kang et al. discloses a self-powered electrochromic timing device in which a color change boundary in an electrochromic material is advanced by a gradual dissolution of an electrode in the presence of an electrolyte. Activation is deferred by isolating or deactivating the electrolyte or by physically separating portions of the electrodes intended for electronic connection. U.S. Pat. No. 5,339,024 to Kuo et al. discloses a voltaic-type charge indicator cell connected in parallel with a main cell. One electrode is dissolved by an amount related to battery condition.

SUMMARY OF INVENTION

Our invention configures electrochemical display cells in an interactive mode to provide choices for activation or to otherwise engage a user to participate in the activation of the displays, which are preferably both self-powered and irreversible. As low-cost high-volume products, our interactive displays are particularly useful as games, including game pieces and. assemblies such as board games and collector cards. Both the electrochemical cell components and their means of activation are preferably arranged in printable layers to facilitate their in-line production and to integrate them with other printed products related to their use.

One embodiment of our invention is an interactive electrochemical display assembly having first and second electrode layers interconnected by both an ionically conductive pathway and an electronically conductive pathway. The first electrode layer temporarily obscures an underlying image from view. A plurality of switches have open states for interrupting at least one of the conductive pathways and closed states for completing portions of the same conductive pathways. The switches are closable in a pattern that triggers an electrochemical reaction that erodes the first electrode layer and reveals the underlying image.

At least one of the conductive pathways is preferably arranged as a logical network interrelating combinations of the open and closed states of the switches. For example, the electronically conductive pathway can be interrupted by two of the switches in series so that closing both switches is required to complete the electronically conductive pathway between the electrode layers. Operation of the switches requires user participation and choices that affect an outcome—the underlying image revealed.

For purposes of illustration, a game piece can be constructed from an electrochemical display cell and a logical network of switch contacts printed in layers on a main substrate. The switch contacts, which are exposed on a surface of the main substrate, interrupt an otherwise hidden electronically conductive pathway between the cell's electrodes. Bogus contacts can also be exposed on the substrate surface, which are indistinguishable from those required to activate the display cell. Accessory substrates that carry a conductive adhesive mount individually on the main substrate to close the switches. The display cell is activated to reveal a hidden message (i.e., the underlying image) after a predetermined combination of the switches has been closed.

Another embodiment of our invention is an interactive compound display assembly including a plurality of mounting pieces and a main substrate having prescribed locations for receiving the mounting pieces. Each of the mounting pieces includes at least a portion of an electrochemical display cell that undergoes an electrochemical reaction for changing between display states. The main substrate includes the remaining portions of the electrochemical display cells at the prescribed locations. Affixing one or more of the display cells to the prescribed locations on the substrate changes the display states of the cells.

The display cells include two electrode layers and an electrolyte layer. The electrolyte layer, which can take the form of an electrolytic adhesive, is preferably carried by the mounting pieces. The mounting pieces can also carry one of the electrode layers and an electronically conductive adhesive for both ionically and electronically coupling the electrode layer of the mounting pieces to a remaining electrode layer at the prescribed locations on the main substrate. The electrode layer of the mounting pieces preferably includes an opening or is transparent for viewing the changes in the display states. The electrode layer of the main substrate is preferably erodable by the electrochemical reactions that change display states and reveal an underlying image.

Alternatively, just the erodable electrode or both electrodes could be incorporated into the mounting piece. The former alternative requires both ionic and electronic interconnections with the other electrode on the main substrate. The latter alternative requires the main substrate to include a switch arm for completing the ionic or the electronic interconnection between the electrodes of the mounting piece. The underlying image preferably remains with the erodable electrode, regardless of whether the erodable electrode is incorporated into the mounting piece or the main substrate.

In yet another embodiment, the participant is responsible for completing an interactive electrochemical display. Two of three electrochemical cell layers, namely two electrode layers and one electrolyte layer, are mounted together on a common substrate and a third of the three electrochemical cell layers is available separately (e.g., supplied by the participant). One of the two electrode layers overlaps (hides) a graphic image. The two electrochemical cell layers that are mounted together are combinable with the third electrochemical cell layer that is available separately in a manner that completes an ionically conductive pathway between the two electrode layers and that initiates an electrochemical reaction that clears the overlapping electrode layer to reveal the hidden image.

For example, the interactive display cell can be constructed with all of its operative layers mounted on. a single substrate except for the electrolyte layer, which is preferably supplied by a participant. One of the operative layers is an electrode layer that overlaps a graphic image. An opening exposes the remaining operative layers for receiving the electrolyte, which is preferably a harmless composition such as salt water, a beverage, a food ingredient, a gelatin, or a safe-handling adhesive. The participant activates the display cell by adding electrolyte through the opening, which triggers an electrochemical reaction that clears the overlapping electrode layer to reveal the image.

Our new interactive display cells and assemblies are particularly well suited for manufacture along an in-line press. All of the active layers including the two electrodes, the electrolyte, and the electronic connection between the electrodes can be printed on one or more webs. Other printed layers or webs can be combined to provide the graphic information, sealing for the electrolyte, or adaptations to other products such as pressure-sensitive labels. The completed display cells are particularly useful for such products as games, message cards, and other single-use applications.

For purposes of this invention and its continuing description, the terms "erode", "oxidize", "dissolve", "clear", and "disappear" are used interchangeably as they pertain to the systematic removal of thin-film electrodes.

DRAWINGS

DETAILED DESCRIPTION

Figure 1:
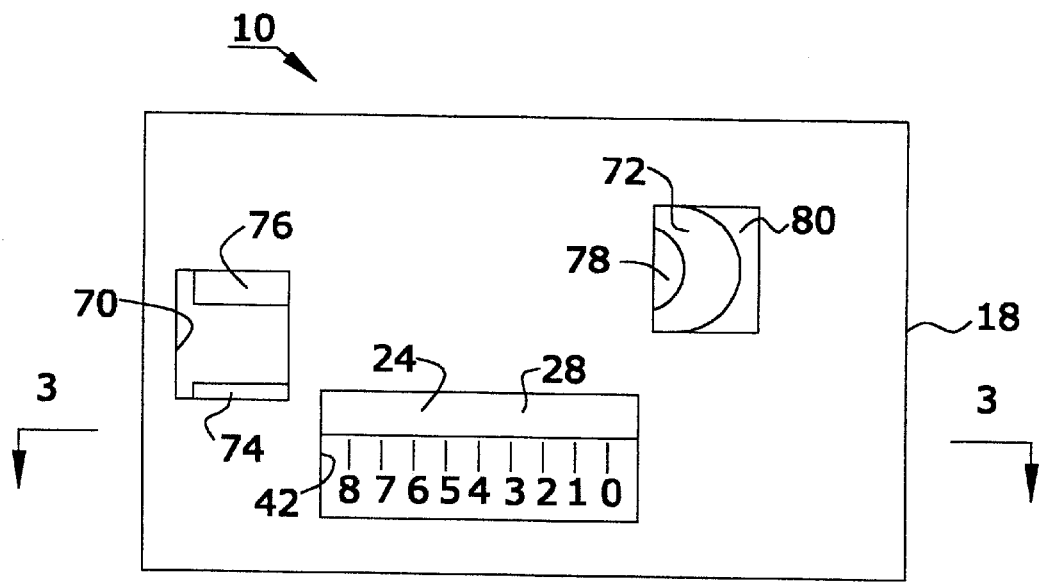
FIG. 1 is a plan view of an interactive display having a viewing window and two openings for completing switches.
Figure 2:
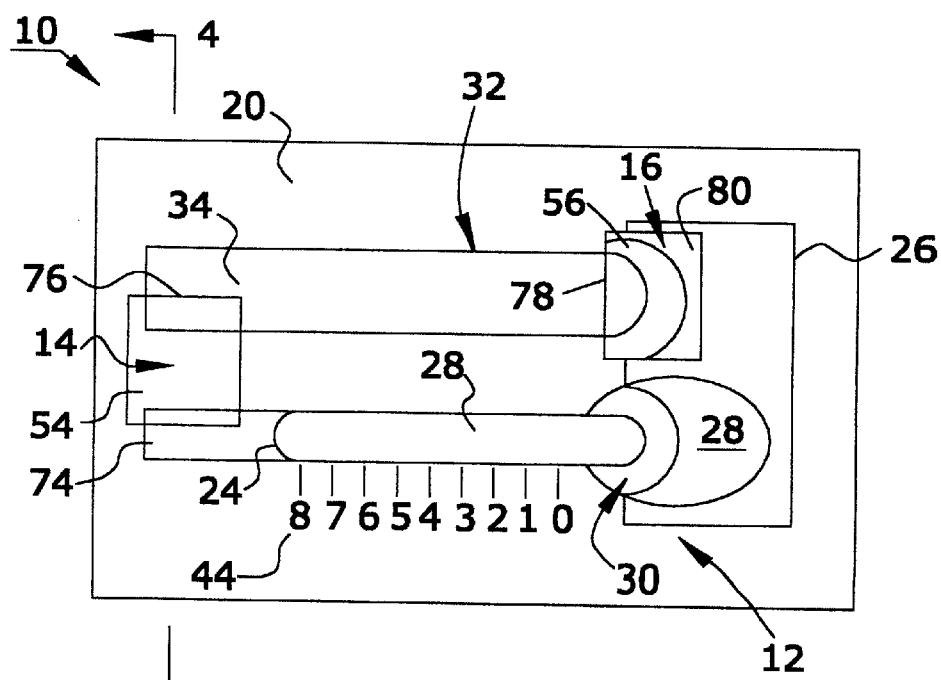
FIG. 2 is plan view of the same display with a top substrate removed to view electrochemical components of the display. Thickness proportions are greatly exaggerated in this and succeeding views to add clarity.
Figure 3:
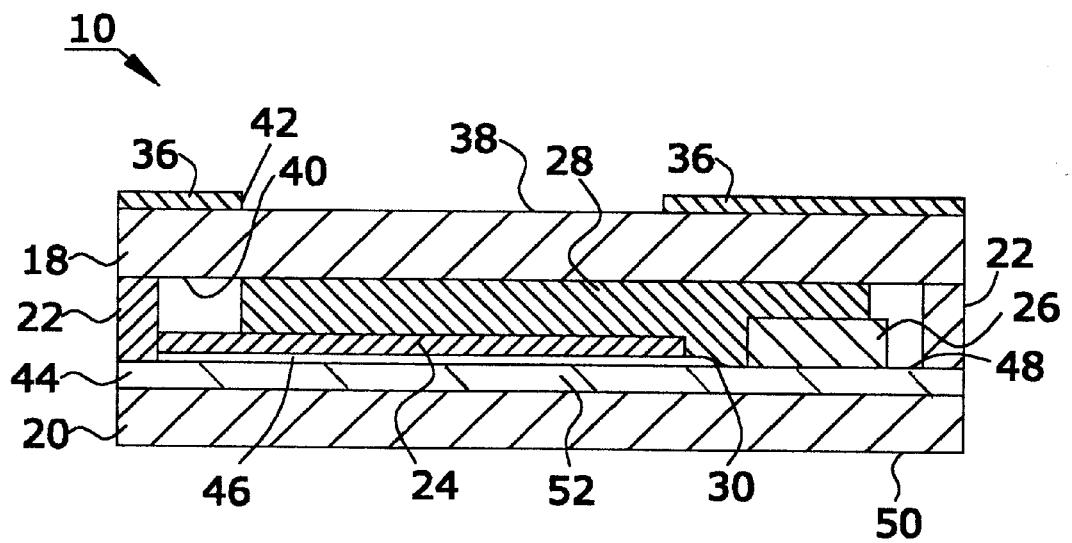
FIG. 3 is a cross-sectional view of the display taken along line 3—3 of FIG. 1.

An interactive electrochemical display assembly 10 depicted in FIGS. 1–3 interposes a single display cell 12 and two electronic switches 14 and 16 between a pair of top and bottom substrates 18 and 20. A dielectric adhesive 22 seals a perimeter of the two substrates 18 and 20 for enclosing the display cell 12 and the two switches 14 and 16.

The display cell 12 includes two electrode layers 24 and 26 laid out side-by-side on the bottom substrate 20. A transparent electrolyte layer 28 overlaps both electrode layers 24 and 26 for completing an ionically conductive pathway 30 between the electrodes 24 and 26. The two switches 14 and 16 interrupt different portions of an electronically conductive pathway 32 between the electrodes 24 and 26. The switch 14 connects the electrode 24 to an electronic conductor 34, and the switch 16 connects the electronic conductor 34 to the electrode 26.

A graphics layer 36 on a front surface 38 of the top substrate 18 includes a window 42 aligned with the electrode 24, and a graphics layer 44 on a front surface 48 of the bottom substrate 20 includes a graphic image 52 that underlies the electrode 24, also in alignment with the window 42. These or other graphics layers could also be applied to a back surface 40 of the top substrate 18 or to a back surface 50 of the bottom substrate 20. In either case, the top substrate 18 should be transparent to allow viewing through the window 42. The bottom substrate 20 only needs to be transparent if the graphic image 52 is formed on its back surface 50 rather than on its front surface 48. Otherwise, the bottom substrate 20 is preferably rendered opaque to block any viewing of the image 52 except through the window 42.

Alternatively, the graphics layers 36 and 44 could be reversed to position the window 42 on the bottom substrate 20 for viewing the image 52 on the top substrate 18. Any layers between the electrode layer 24 and the top substrate 18, including the electrolyte layer 28, could also function as a graphics layer that participates in the formation of the image 52. Again, the substrate 18 or 20 supporting the window 42 is transparent, and the other substrate 18 or 20 only needs to be transparent if it would otherwise block the image 52.

The top and bottom substrates 18 and 20 of the display assembly 10 are preferably made of film, such as Mylar polyester or PET (polyethylene terephtalate). However, a variety of other substrates including coated paper could also be used, especially if transparency is not required. The graphic layers 36 and 44 are preferably formed by inks applied in various colors or patterns to enhance the performance of the display assembly 10. The graphic image 52 can range from a patch of color to text, patterns, or pictures intended for later display.

The electrode layer 24 is preferably a thin metal film that has been deposited (e.g., sputtered or otherwise metalized) onto a transparent backing layer 46 that can be used to support the thin film during its manufacture and subsequent mounting on the substrate 20. Aluminum is the preferred metal of the thin metal film because of its low cost and ready availability in thin film form. The thin metal film of the electrode layer 24 could also be deposited directly onto the top or bottom substrate 18 or 20 in a predetermined pattern or in a pattern formed by later processing.

The electrode layer 26 can be made of carbon and function as its own current collector, or another electrode material such as manganese dioxide can be printed over a carbon collector. The electrode layer 26 can also be constructed as a thin metal film, such as silver, deposited onto the top or bottom substrate 18 or 20 or a separate backing layer. However, the materials forming the electrode layers 24 and 26 preferably differ in electrode potential to support spontaneous electrochemical (i.e., galvanic) reactions.

The dielectric adhesive 22 is preferably a hot melt adhesive; but other, preferably electrically inactive adhesive materials, could also be used. The electrolyte layer 28 also preferably has adhesive properties for staying in place and for further joining the two substrates 18 and 20 together. An electrolytic adhesive can be made by mixing an electrolytic salt into an adhesive, such as a pressure sensitive or UV-curable adhesive or an animal glue.

Figure 4:
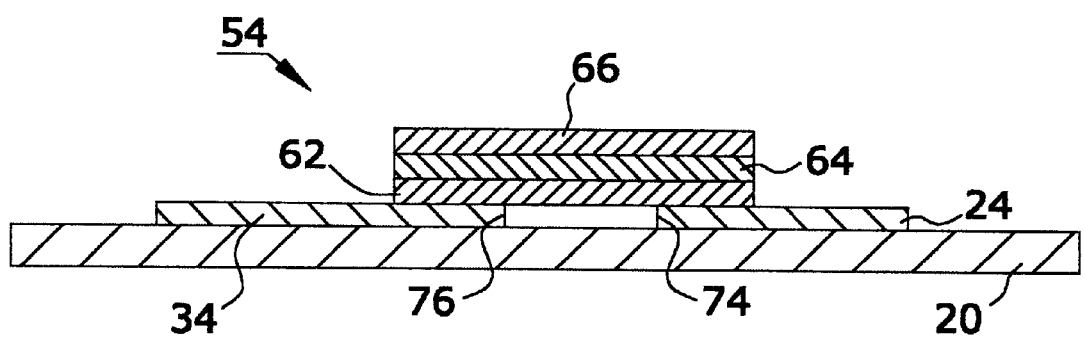
FIG. 4 is a partial cross-sectional view of a switch taken generally along line 4—4 of FIG. 2.

The two switches 14 and 16 include switch arms 54 and 56, which are similarly structured as exemplified by the switch arm 54 illustrated in FIG. 4. A conductive tape 62 is laminated onto a thin metallic film 64, such as copper or aluminum, and overlaid by a graphics layer 66 indicating how the user is to place the switch arm 54 to complete a portion of the electronically conductive pathway 32. A release liner (not shown) can be used to protect the conductive tape 62 until ready for use. An example of the conductive tape 62 is 3M product number 9703. The referenced tape 62 is conductive normal to its plane of lamination; and the metallic film 64, which is in electrical contact with the tape 62, carries current parallel to this plane for bridging the gap between the electrode 24 and the electronic conductor 34.

Openings 70 and 72 expose open contacts 74 and 76 of the switch 14 and open contacts 78 and 80 of the switch 16 through the top substrate 18. Activation of the display assembly 10 is accomplished by removing the release liners and applying the switch arms 54 and 56 across the contact pairs 74, 76 and 78, 80 to complete the electronically conductive pathway 32. The conductive tape 62 of both switch arms 54 and 56 forms a permanent bond with the contacts 74, 76 and 78, 80 so that no further action is required to maintain the display cell 12 in an active state. If needed, conductive carbon can be applied to either or both of the contact pairs 74, 76 and 78, 80 exposed within the openings 70 and 72 to assure a more durable electronic connection.

Figure 5:
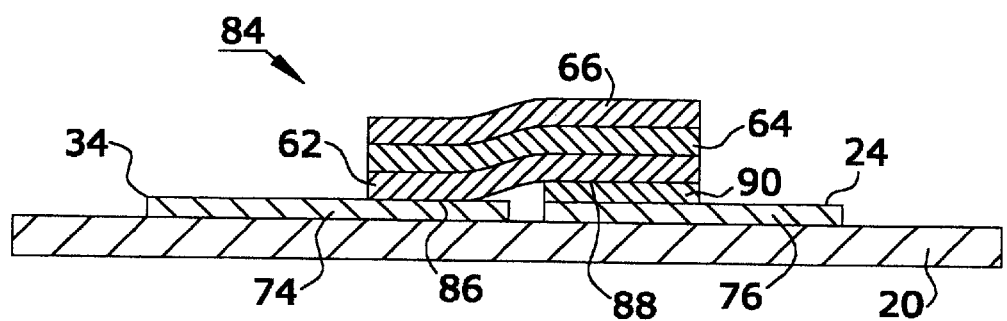
FIG. 5 is a cross-sectional view similar to FIG. 4 of an alternative switch.
Figure 6:
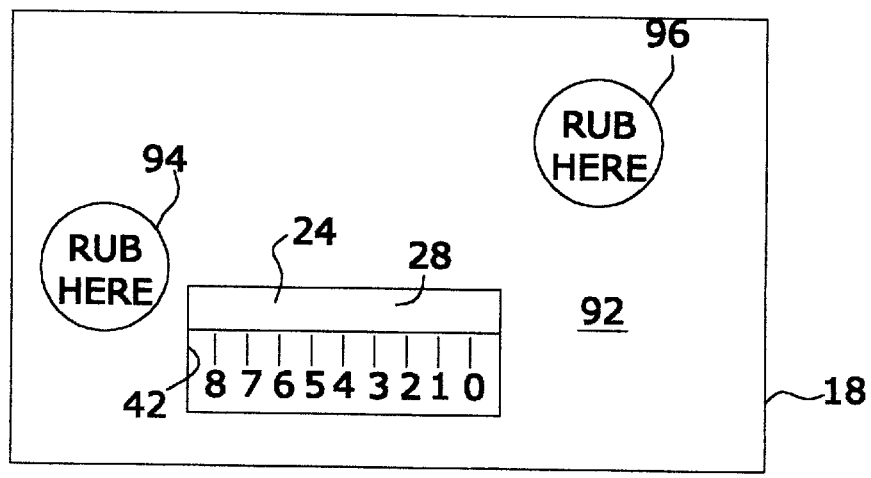
FIG. 6 is a plan view of the display modified to accommodate the alternative switch.
Figure 7:
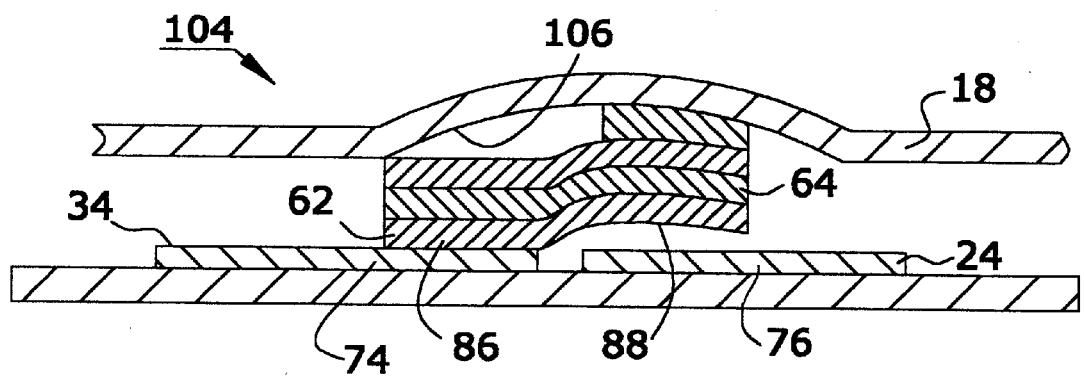
FIG. 7 is cross-sectional view of another alternative switch.

Instead of forming the switch arms 54 and 56 as separate structures, the switch arms could be permanently incorporated into similar display assemblies as shown in FIGS. 5–7. Features in common with the switch arms 54 and 56 and the display assembly 10 are referenced with the same numerals.

For example, an alternative switch arm 84 shown in FIG. 5 includes similar layers of conductive tape 62, metallic film 64, and graphics 66. However, one portion 86 of the conductive tape 62 is permanently joined to the contact 74 of the electronic conductor 34, and another portion 88 of the same conductive tape 62 is temporarily separated from the contact 76 of the electrode layer 24 by a passivation layer 90 constructed from a fragile dielectric material. Alternatively, a removable release liner with a pull tab could be substituted for the passivation layer 90 to temporarily separate the switch arm 84 from the electrode contact 76. Of course, breaking either contact 74 and 76 would have the same electrical effect. A similar switch arm, not shown, can be used to bridge the contacts 78 and 80.

An alternative upper graphics layer 92 of the substrate 18 can be arranged as shown in FIG. 5 to provide instructions for activating the display cell 12, such as by rubbing or scratching designated areas 94 and 96 of the top substrate 18. Once broken, adhesives of the conductive tapes 62 penetrate the passivation layers 90 and complete the electronically conductive pathway 32 between the two electrodes 24 and 26.

Figure 8:
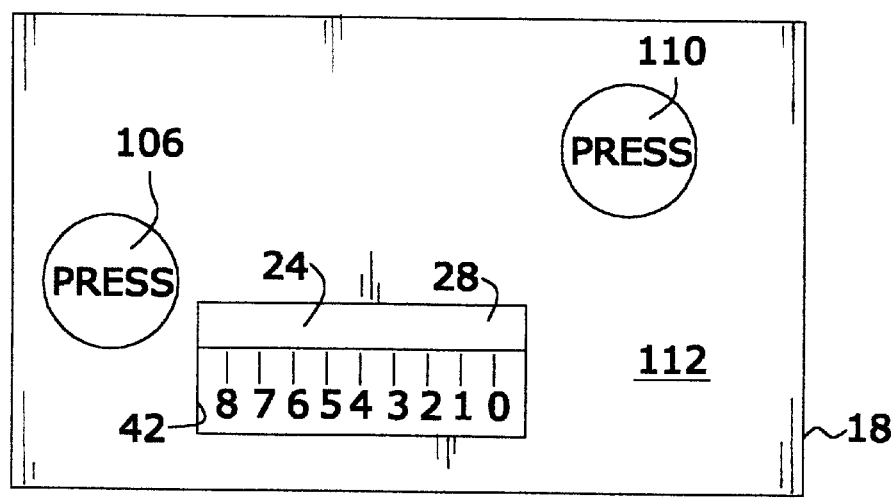
FIG. 8 is a plan view of modifications to accommodate the switch of FIG. 7.

Another configuration for a switch arm 104 is depicted in FIGS. 7 and 8. The tape, film, and graphic layers 62, 64, and 66 are the same as in the prior examples. The portion 86 of the conductive tape 62 is permanently joined to the contact 74 of the electronic conductor 34, and the other portion 88 of the same conductive tape 62 is temporarily separated from the contact 76 of the electrode layer 24 by conforming to a raised or dimpled portion 106 of the top substrate 18. An adhesive 108 holds the switch arm 104 out of contact with the electrode 24 until the dimpled portion 106 of the top substrate 18 is depressed. A similar switch is configured under another dimpled portion 110 of the top substrate 18 for bridging the electrodes 78 and 80. An upper graphics layer 112 contains instructions for depressing the dimpled portions 106 and 110 to activate the display cell 12.

The tape and film layers 62 and 64 can be replaced by a variety of conductors, such as printed carbon, to perform similar switching functions and can even be eliminated altogether by arranging the substrates 18 and 20 to permit the paired contacts 74, 76 and 78, 80 to be folded together. Also, the switching can be carried out directly as shown or indirectly as a consequence of other actions, such as opening packaging containing the display assembly 10.

However activated, completion of both the ionically conductive pathway 30 and the electronically conductive pathway 32 triggers an electrochemical reaction that erodes the thin-film electrode 24 and reveals the underlying image 52. In the illustrated side-by-side configuration of the electrodes 24 and 26, the erosion starts at the closest point of the electrode 24 to the electrode 26 and proceeds to increasingly remote points. The electrolyte 28 can also be arranged with a limited viscosity to migrate together with a receding boundary of the thin-film electrode for such purposes as providing a timing function or more complete clearing of the electrode 24. A commonly assigned, copending U.S. application Ser. No. 09/067,114, filed Apr. 27, 1998, entitled "Electrochemical Display and Timing Mechanism with Migrating Electrolyte", now U.S. Pat. No. 5,930,023, discloses more examples of display cells appropriate for use with the present invention and is hereby incorporated by reference.

Figure 9:
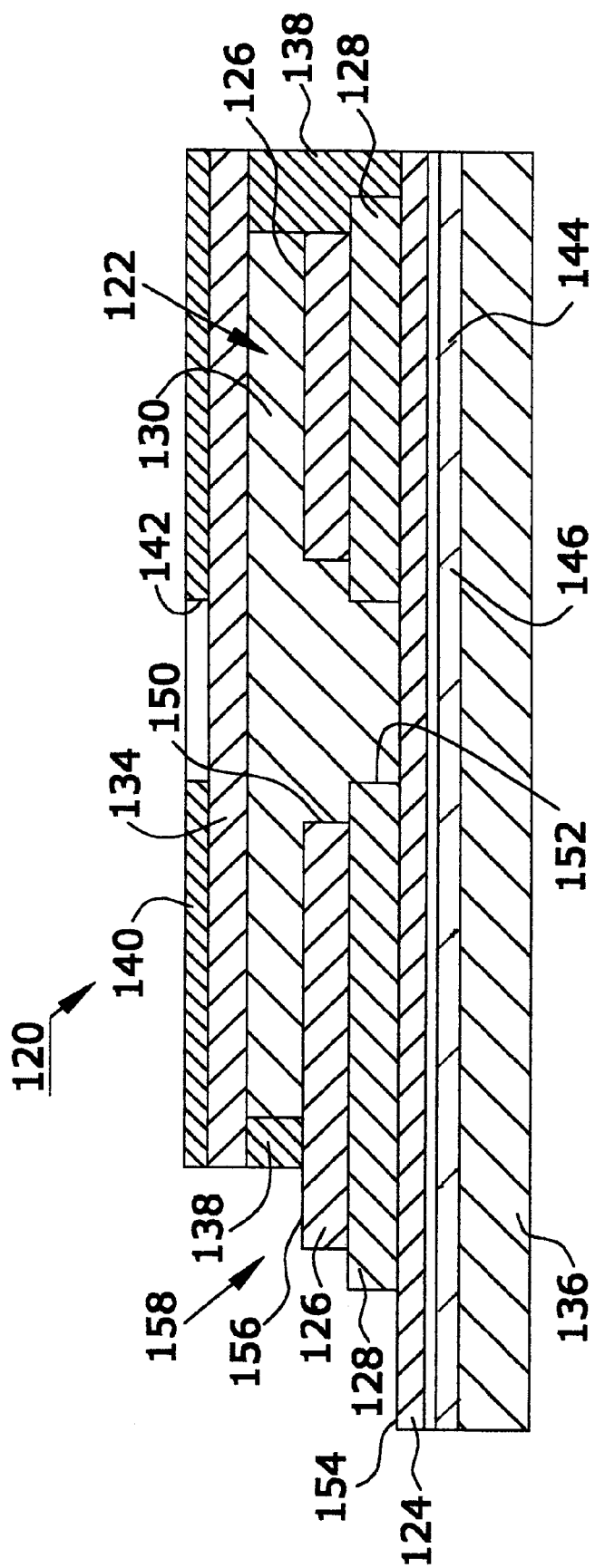
FIG. 9 is a cross-sectional view of an alternative interactive display having a stacked configuration of electrodes.

A display-cell assembly 120 having a display cell 122 with a stacked configuration of electrode layers 124 and 126 is depicted in FIG. 9. The electrodes 124 and 126, which have different electrode potentials, are electronically isolated by a dielectric layer 128 but are both overlapped by a transparent electrolyte layer 130 that completes an ionically conductive pathway between the electrodes 124 and 126. The two electrode layers 124 and 126, the dielectric layer 128, and the electrolyte layer 130 are captured between top and bottom substrates 134 and 136. A dielectric adhesive layer 138 seals the top and bottom substrates 134 and 136 and further confines the electrolyte layer 130.

A graphics layer 140 including a window 142 is printed on the top substrate 134, and a graphics layer 144 including a graphic image 146 is printed on the bottom substrate 136. The window 142 is aligned with openings 150 and 152 in the electrode layer 126 and the dielectric layer 128 as well as with the image 146 that is hidden by the electrode layer 124. A single pair of switch contacts 154 and 156 of a switch 158 is exposed for completing an electronically conductive pathway between the electrodes 124 and 126. Folding the contact 154 together with the bottom substrate 136 against the contact 156 closes the switch 158. A conductive adhesive (not shown) can be applied to one of the contacts 154 or 156 to more permanently close the switch 158. A release liner (also not shown) can be used to protect the contact adhesive prior to use. More examples of stacked electrode display cells that are useful for purposes of this invention are disclosed in commonly assigned U.S. application Ser. No. 09/067,374, filed Apr. 27, 1998, entitled "Electrochemical Display Cell with Focused Field", now U.S. Pat. No. 5,912,759; and this patent is hereby incorporated by reference.

Additional switches arranged in series or in parallel with the switch 158 can be provided to expand opportunities for user participation with the activation of the display cell 122. The additional switches can interrupt either the electronically or ionically conductive pathways between the electrodes 124 and 126.

Figure 10:
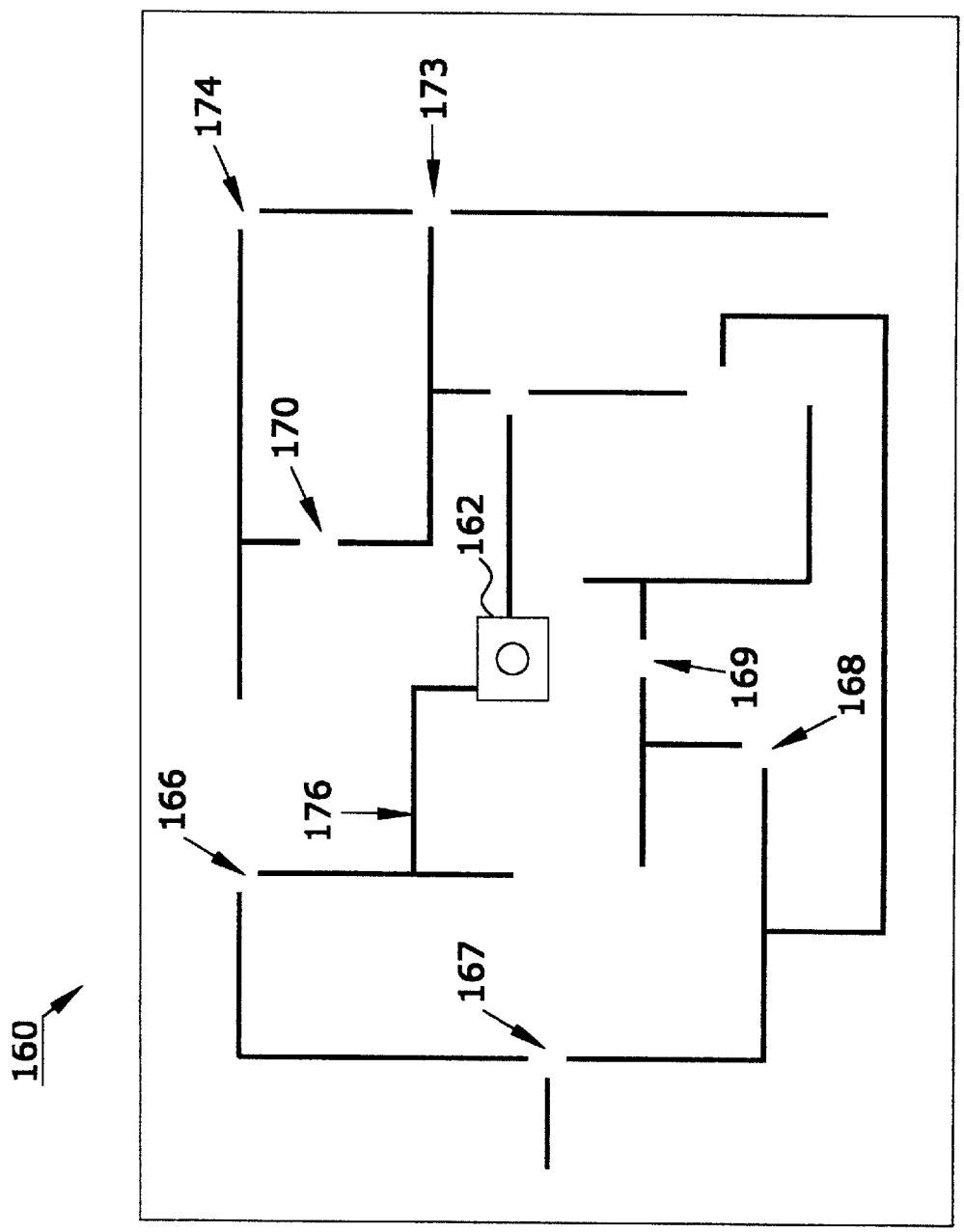
FIG. 10 is a plan view of a multiple-switch playing card having a single display cell activated by a combination of switches.

A schematic lay-out of a multiple-switch playing card 160 incorporating underlying layers similar to those of the preceding embodiments is found in FIG. 10. At the center is a single display cell 162 surrounded by a logical network 164 interrelating combinations of switches 166–174, some of which interrupt an electronically conductive pathway 176 between electrodes (not shown) of the display cell 162. The electronically conductive pathway 176 is completed by closing the switches 166, 167, 171, and 172. The open or closed states of the remaining switches 168, 169, 170, 173, and 174 have no effect on the operation of the display cell 162.

Switch arms (not shown) for closing at least the switches 166, 167, 171, and 172 can be formed as separate game (mounting) pieces, such as shown in FIG. 4, or can be incorporated into the playing card 160, such as shown in FIGS. 5 and 7. The game proceeds by inviting a participant to close one or more switches at a time without knowing in advance the combination required to activate the display cell 162 and reveal the underlying message.

Figure 11:
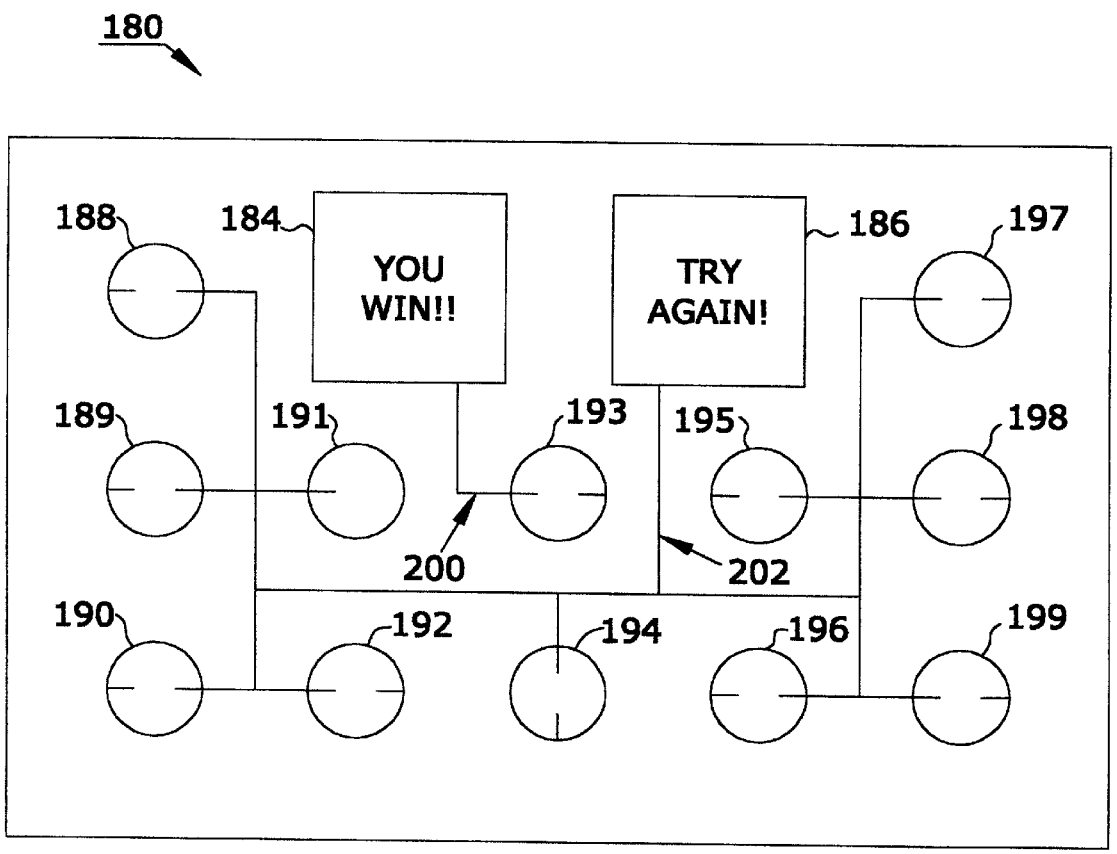
FIG. 11 is a plan view of another multiple-switch playing card having two display cells activated by different combinations of switches.
Figure 12:
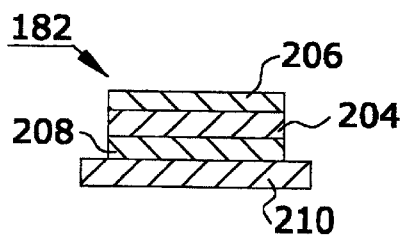
FIG. 12 is a cross-sectional view of an exemplary switch arm for closing the playing card switches.

More than one display cell can also be incorporated into such playing cards and be activated by a different switch or a different combination of switches. For example, FIGS. 11 and 12 depict a multiple display-cell playing card 180 and an exemplary switch-arm game piece 182. One of the display cells 184 contains the hidden message "You Win!", and the other of the display cells 186 contains the hidden message "Try Again". An array of designated areas 188–199 expose switch contacts. Only one of the designated areas 193 exposes switch contacts that complete an electronic pathway 200 for activating the display cell 184. The remaining designated areas 188–192 and 194–199 expose switch contacts that are connected in parallel for completing an electronic pathway 202 for activating the display cell 186.

The switch-arm game pieces 182 are laminated structures that include a substrate 204 having a front surface supporting a graphics layer 206 and a back surface supporting a conductive adhesive layer 208. A release liner 210 covers and protects the adhesive layer 208 until ready for use. The conductive adhesive layer 208 is intended to be conductive in all planes but could also be laminated to a solid conductor, like the prior switch arm 54, to assist conductivity in its plane of lamination. The release liner 210 includes a layer of release, such as silicone, on another substrate, such as Kraft paper.

Figure 13:
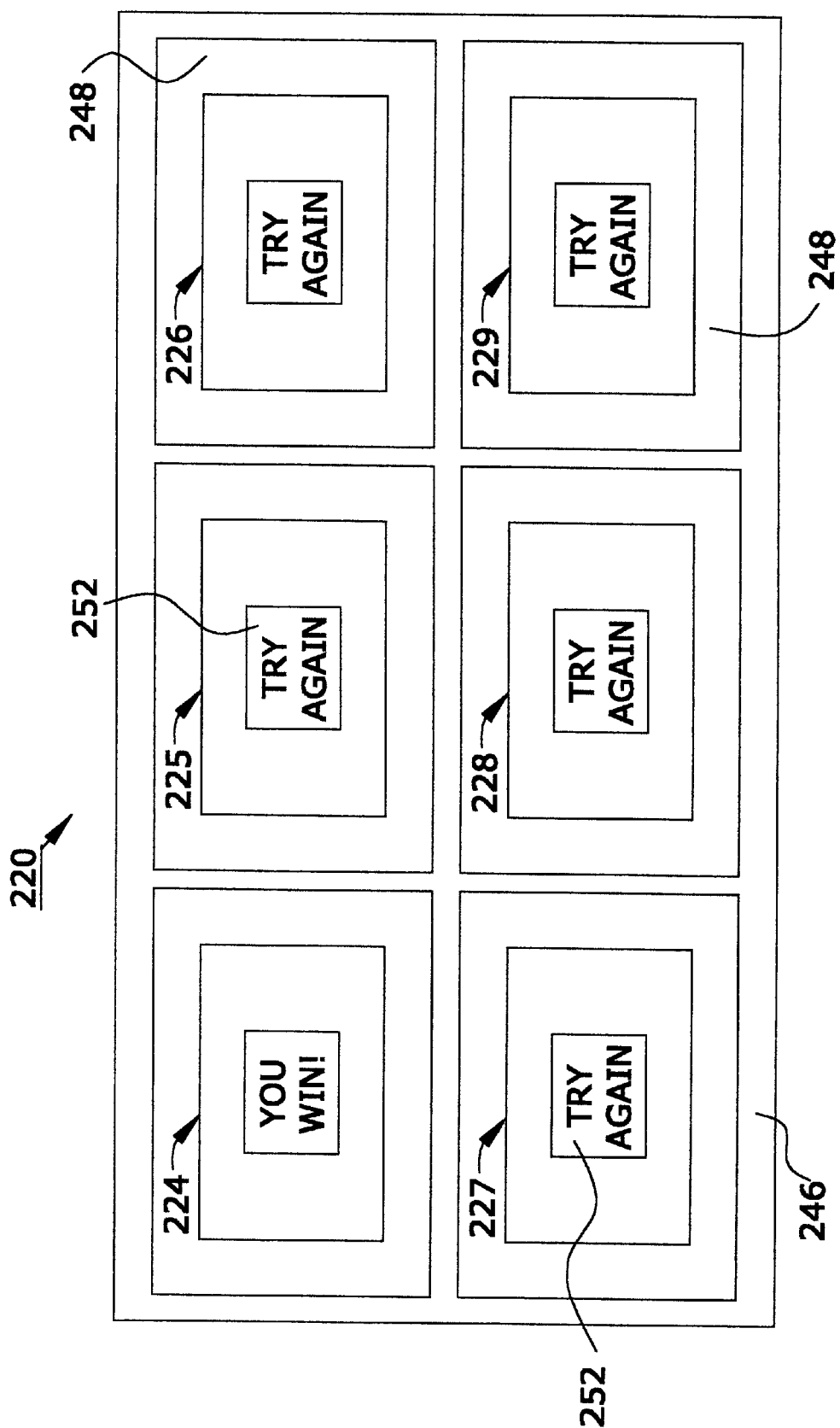
FIG. 13 is a plan view of a multiple display-cell playing card having display cells only partially assembled.

An ionically conductive pathway between electrodes can also be interrupted to control activation of the display cells. For example, FIGS. 13–15 depict a multiple display-cell playing card 220 and one of a plurality of electrolytic game pieces 222 that complete ionically conductive pathways for activating individual display cells 224–229.

Figure 14:
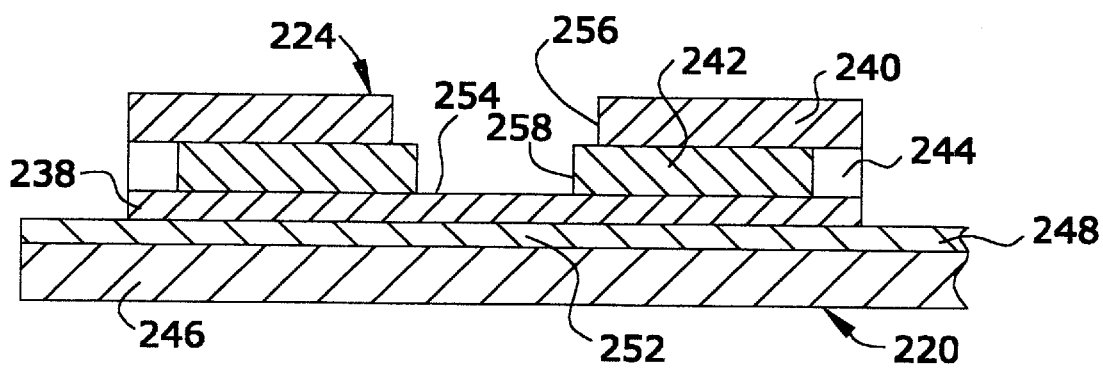
FIG. 14 is a cross-sectional view of one of the partially disassembled display cells.

In the cross-sectional view of FIG. 14, the illustrated display cell 224 resembles the stacked electrode display cell 122 of FIG. 9 minus the electrolyte layer 130. Each of the display cells 224–229 incorporated into the playing card 220 includes two electrode layers 238 and 240 partially separated by a dielectric layer 242. A conductive adhesive layer 244 surrounding the dielectric layer 242 permanently completes an electronically conductive pathway between the electrode layers 238 and 240. The electrode layer 238 can extend continuously throughout the display cells 224–229. However, the electrode layer 240 is preferably discontinuous to electronically separate the same cells 224–229.

A substrate 246 supporting the display cells 224–229 has a graphics layer 248 that includes a graphic image 252 hidden beneath a portion 254 of the electrode layer 238. The electrode layer 240 and the dielectric layer 242 include aligned openings 256 and 258 that expose the portion 254 of the electrode layer 238. A top substrate (not shown) could also be used to support another graphics layer, but large openings would be required to expose both electrodes 238 and 240.

Figure 15:
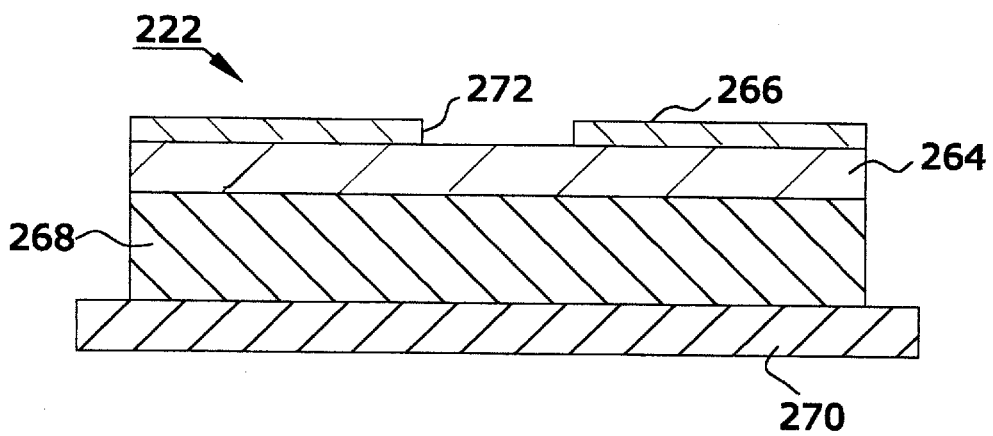
FIG. 15 is a cross-sectional view of a game piece containing an electrolytic adhesive for completing and activating the display cell.

The electrolytic game pieces 222 shown in FIG. 15 include a transparent substrate 264 supporting a graphics layer 266 and an electrolytic adhesive layer 268. A release liner 270 protects the electrolytic adhesive layer 268 prior to use. The graphics layer 266 includes a window 272 to permit viewing through a portion of the game pieces 222.

The game is played by distributing the playing card 220 and one or more game pieces 222 to a participant, who removes the release liners 270 and mounts the game pieces 222 on the exposed electrodes 238 and 240 of the playing card 220. The electrolytic adhesive layer 268 of the game pieces 222 completes an ionically conductive pathway between the electrodes 238 and 240 and triggers an electrochemical reaction that erodes the exposed portion 254 of the electrode 238 to reveal the underlying image 252 through the window 272 of the game pieces 222 and the aligned openings 256 and 258 in the playing card 220.

The images 252 can differ among the display cells 224–229 so that the game results can be affected by the position or the number of display cells activated by the game pieces 222. For example, activation of a single one of the display cells 224–229 can be arranged to produce a winning or losing result, or activation of more than one of the display cells 224–229 can be required to complete the game. Collector cards could require acquiring enough of the game pieces 222 to activate all of the display cells 224–229.

In addition to the electrolyte layer, any one or more of the display-cell layers can be incorporated into the game pieces instead of the playing card. For example, one or both of the electrodes can be incorporated into the game pieces. In the latter instance, the playing card could contain only the electrolyte layer or only electronic switch arms similar to some of the game pieces described above.

Figure 16:
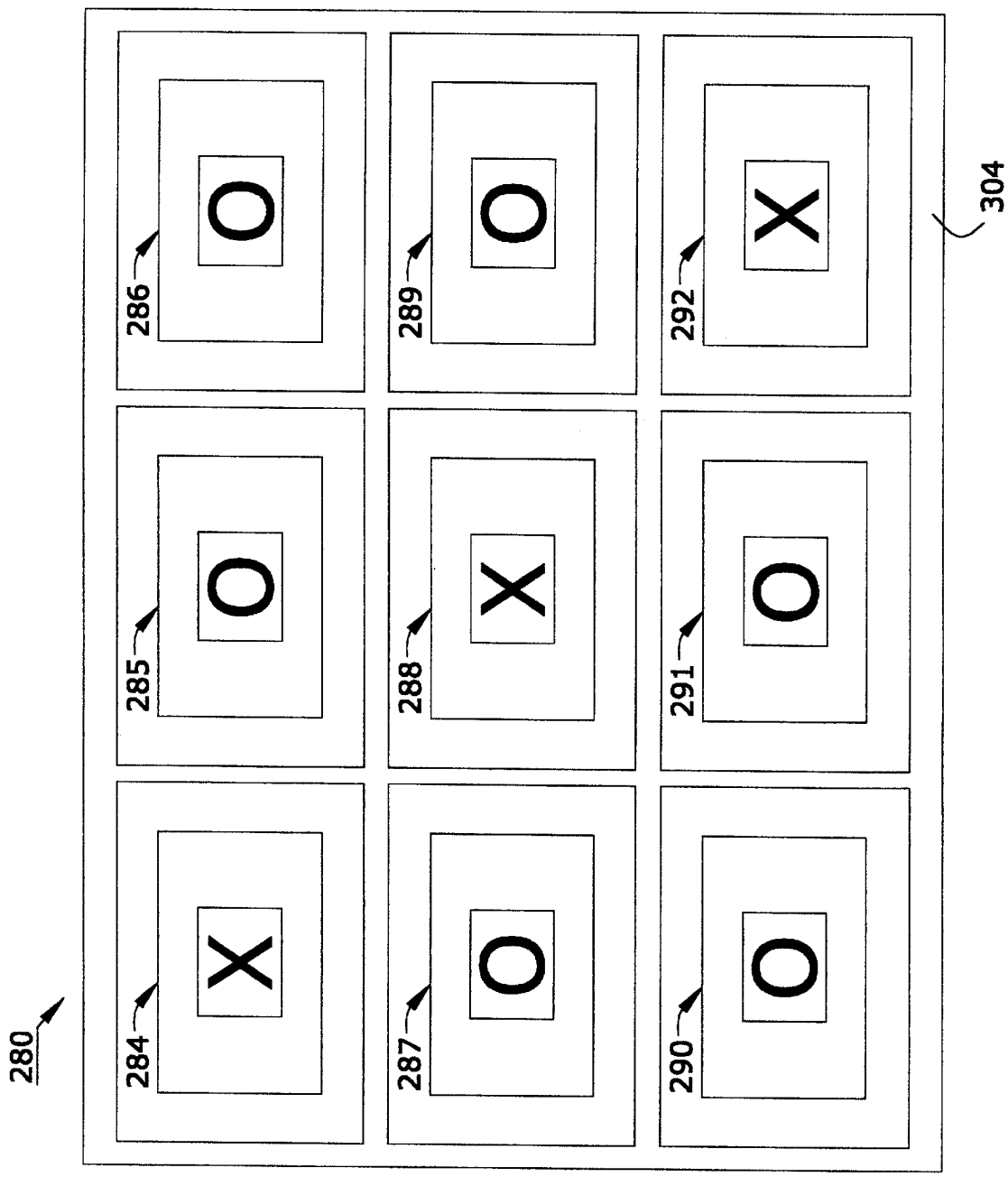
FIG. 16 is a plan view of another multiple display-cell playing card.
Figure 17:
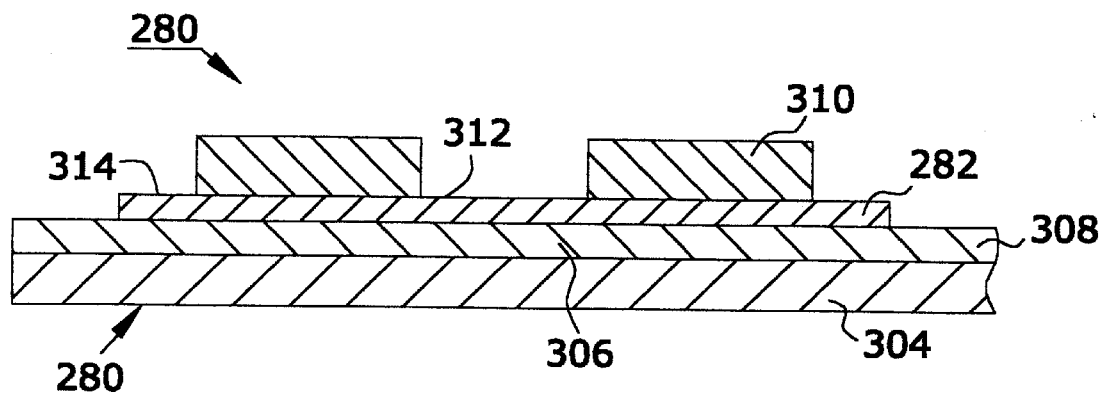
FIG. 17 is a cross-sectional view of one of the display cells of FIG. 16, which is further disassembled to defer activation.
Figure 18:
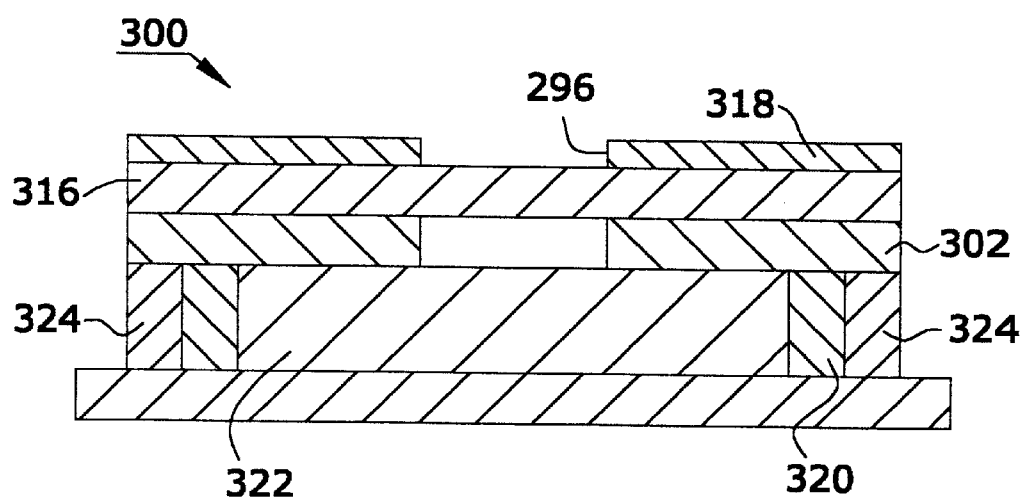
FIG. 18 is a cross-sectional view of a game piece containing the remaining components for completing and activating the further disassembled display cell.

FIGS. 16 and 17 disclose a collector card 280 that contains one electrode 282 of each of a plurality of display cells 284–292, and FIG. 18 discloses one of a plurality of game pieces 300 that contain the other electrode 302 of the same display cells 284–292. The electrode 282, which is preferably an erodable thin film, is supported on a substrate 304 of the collector card 280 overlying a graphic image 306 printed in a graphics layer 308 on the same substrate 304. A dielectric layer 310 divides the thin-film electrode 282 into two parts 312 and 314 that form separate contact portions of ionically and electronically conductive pathways of the display cells 284–292.

In addition to the other electrode 302, the game piece 300 also includes a transparent substrate 316 and a graphics layer 318 containing a window 296. A dielectric layer 320 on the electrode 302 separates an electrolytic adhesive 322 and an electronically conductive adhesive 324. The display cells 284–292 are activated by mounting the game pieces 300 on the collector card 280 so that the electrolytic adhesive 322 and the electronically conductive adhesive 324 separately contact the two parts 312 and 314 of the thin-film electrode 282.

The resulting erosion of the thin-film electrode 282 reveals the underlying image 306, which in the illustration is either an "X" or an "O" mark of a tic-tack-toe game. A minimum of three game pieces 300 must be collected and mounted on the collector card 280 to complete the game. Alternatively, each of the display cells 284–292 could reveal a portion of a larger pattern or picture that is completed by mounting a predetermined number of game pieces 300.

Figure 19:
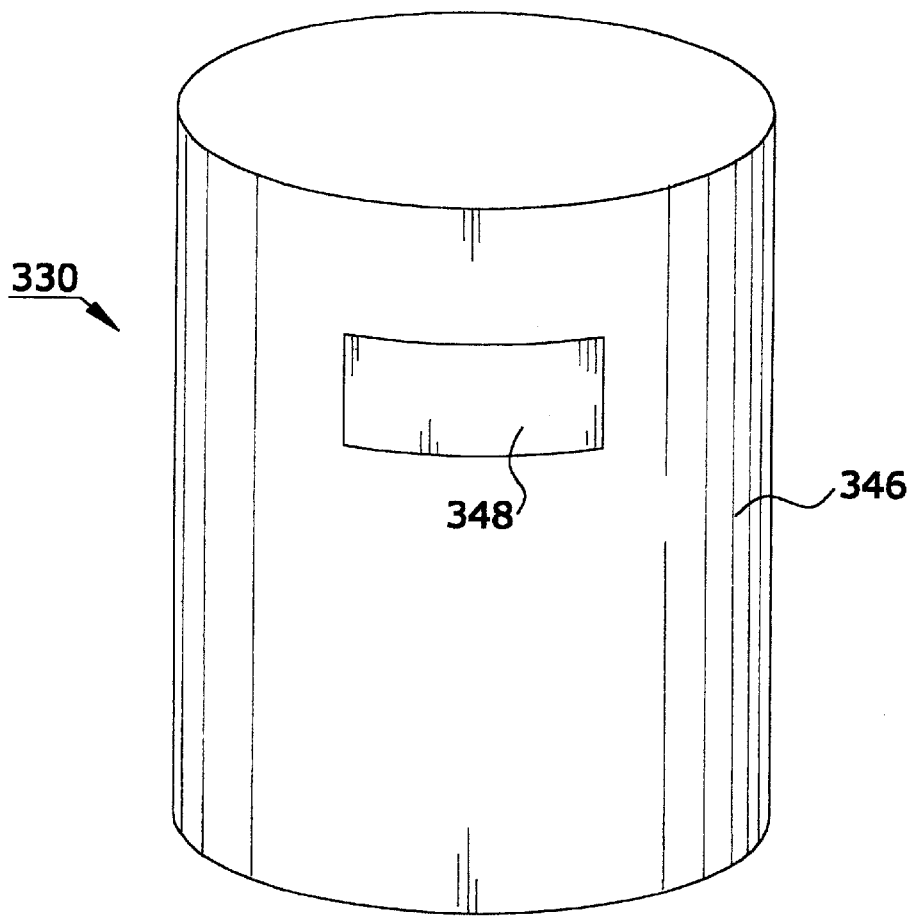
FIG. 19 is a perspective view of a beverage container having an exposed metal portion capable of functioning as an electrode.
Figure 20:
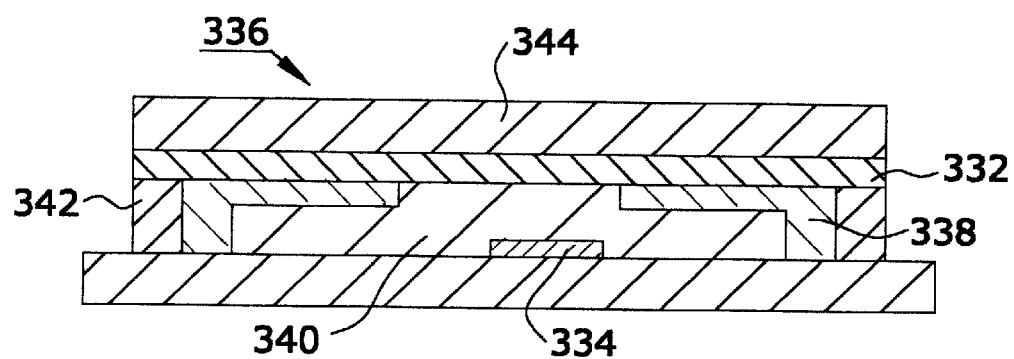
FIG. 20 is a cross-sectional view of a display-cell mounting piece that is activated by mounting the piece on the exposed portion of the container.

FIGS. 19 and 20 illustrate an example of a display-cell assembly 330 in which a thin-film electrode 332 temporarily covers a graphic image 334 on a mounting piece 336. A dielectric layer 338 of the mounting piece 336, which is also mounted on a common substrate 344, separates an electrolytic adhesive 340 from an electronically conductive adhesive 342. A main substrate 346, which takes the form of a beverage container in FIG. 19, includes an exposed metal area 348 that functions as an electrode of the display-cell assembly 330. A variety of metal and non-substrates, including those in which an electrode has been added, can be used for completing the display-cell assemblies 330. The electrode potentials of the two electrodes 332 and 348 of the display-cell assembly should be sufficiently different to support a spontaneous electrochemical reaction that erodes the electrode 332.

The graphic image 334 is printed over just a portion of the electrolytic adhesive 340 so that another portion remains for completing an ionically conductive pathway. Alternatively, the image 334 could be formed by patterning the dielectric layer 338 on the thin-film electrode 332. The patterned dielectric would remain for forming an image after erosion of adjacent areas of the thin-film electrode 332.

The display-cell assembly 330 is activated by affixing the mounting piece 336 to the electrode 348 in a position that allows both the electrolytic adhesive 340 and the electronically conductive adhesive 342 to separately contact the electrode 344 for completing ionically and electronically conductive pathways between the electrodes 332 and 348. In contrast to many of the preceding embodiments, any information revealed by activation of display-cell assembly 330 is contained in the mounting piece 336 rather than in the main substrate 342 on which it is later mounted. Combinations are also possible in which both the mounting piece and the substrate contain the imageable portions of different display cells. Also, both electrodes and the electrolyte can be incorporated into the mounting piece, and the main substrate could provide one or more switch arms.

Figure 21:
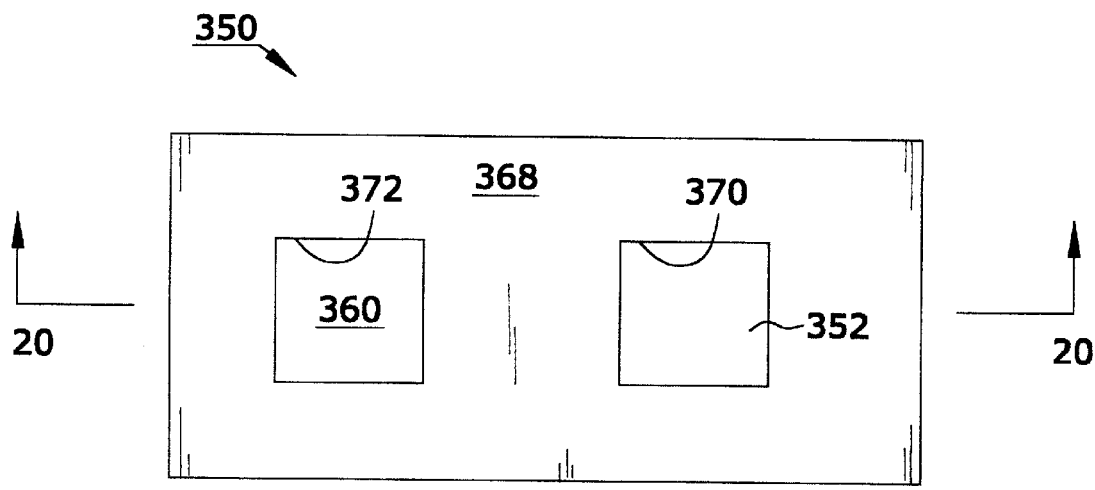
FIG. 21 is a plan view of an interactive display having a display window and an opening for adding electrolyte to complete the display.
Figure 22:
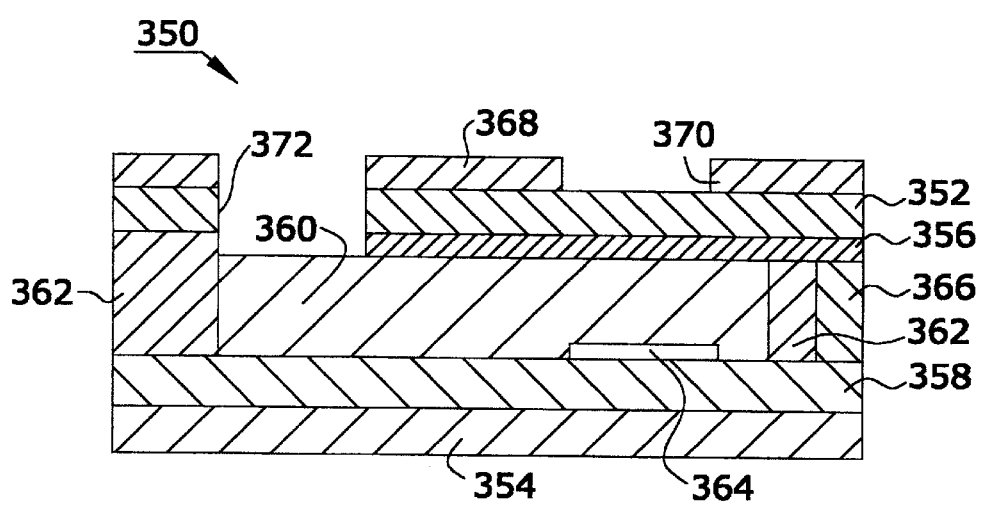
FIG. 22 is a cross-sectional view of the display of FIG. 21.

Another display-cell assembly 350, which lacks only an electrolyte for activation, is shown in FIGS. 21 and 22. Between top and bottom substrates 352 and 354, two electrode layers 356 and 358 are stacked together and separated by a porous spacer 360. A dielectric adhesive 362 surrounds the porous spacer 360, and a graphic image 364 is printed between the electrodes 356 and 358. An electronically conductive adhesive 366 completes an electronically conductive pathway between the electrodes 356 and 358 beyond the dielectric adhesive 362.

The electrode 356 is preferably a thin metal film, such as aluminum; the top substrate 352 is preferably transparent; and a graphics layer 368 on the top substrate 352 includes a window 370 in alignment with the graphic image 364. The porous spacer 360 extends beyond the thin-film electrode layer 356 beneath an opening 372 in the top substrate 352. Electrolyte (not shown) introduced through the opening 372 diffuses between the electrodes 356 and 358 triggering an electrochemical reaction that erodes the thin-film electrode 356 and reveals the underlying graphic image 364. The electrolyte is preferably a harmless composition such as salt water, a beverage, a food ingredient, a gelatin, or a safe-handling adhesive.

The display assembly 350, like other of the display assemblies described earlier, can be incorporated into a game piece, a game board or card, or product packaging. The opening 372 would also be aligned with the graphic image 364 similar to the display-cell assembly of FIG. 9. Also, the opening 372 could be used to add electrolyte to more than one display cell to provide more options for producing visual effects.

Figure 23:
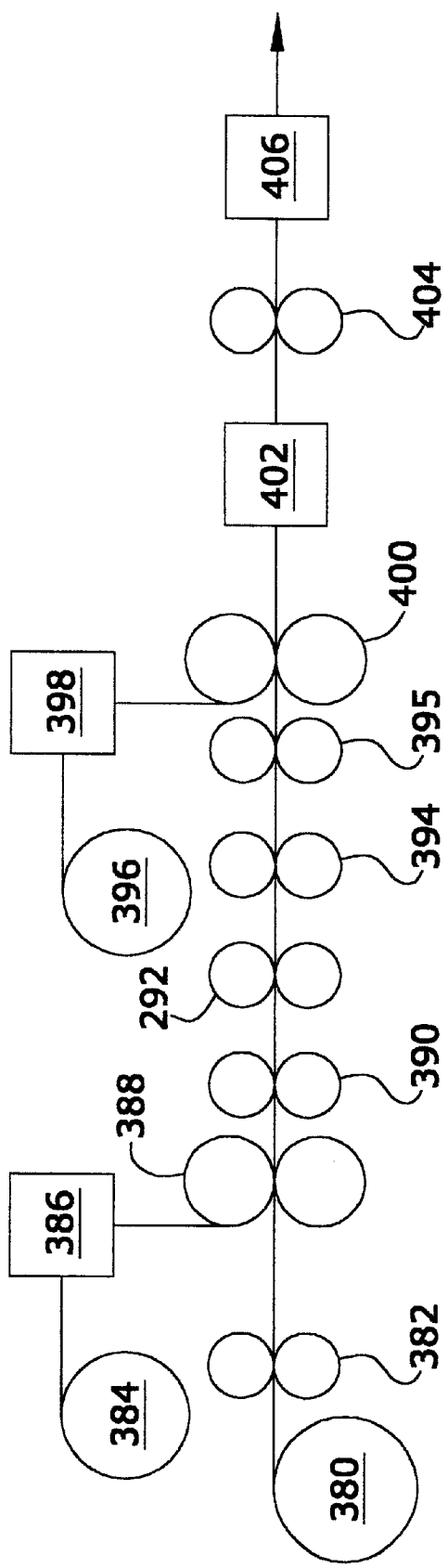
FIG. 23 is a diagram of an in-line press for making the interactive display cells.

A diagram of an in-line press that can be used to print and assemble the interactive display-cell assemblies described here is shown in FIG. 23. Using the interactive display assembly of FIGS. 1–3 as an example, a bottom substrate 380 is unrolled and advanced through a print station 382 for application of graphics. A metalized film electrode 384, such as vapor-deposited aluminum, is patterned at station 386 and laminated at station 388 to the printed bottom substrate 380. Another electrode layer is applied in a succession of patterns to the printed bottom substrate 380 at station 390. A patterned UV-curable adhesive is applied to the bottom substrate 380 at station 392, and a UV-curable adhesive electrolyte is applied across the two electrodes at station 394. Switch contacts for interrupting an electronically conductive pathway between the electrode layers are applied at station 395. A top substrate 396 is unrolled, patterned at station 398, and laminated over the successions of patterns on the bottom substrate 380 at station 400. A UV-curing station 402 cures the adhesive layers to permanently bond the substrates 380 and 396 together. Another printing station 404 applies more graphics, and a die cut station 406 divides the successively patterned portions into individual display cells that can be stacked, rolled, or further processed.

The thin metal films arranged as disappearing electrode layers in the preceding embodiments are all preferably formed by deposition onto non-conductive substrates and are distinguished from metal foils that are thinned from thicker metal forms. Deposition methods include vacuum evaporation, cathode sputtering, electroplating, and various chemical reactions in a controlled atmosphere or electrolyte. The deposited metal for the anode electrode is preferably aluminum; but other metals could also be used, such as copper, zinc, silver, or gold. The deposited material for the cathode electrode is preferably carbon, but thin films such as silver can also be used in combination with the aluminum film anode.

The display cells can be switched from a first state in which the thin metal film of the anode is opaque to a second state in which a designated area of the thin metal film becomes substantially transparent, but the display cells cannot be restored to the first state. The erosion that takes place in the thin metal films to reveal graphic images is irreversible. The graphic images remain permanently displayed through transparent portions of the non-conductive substrates that support the thin metal films.

All of the substrates, including the substrate that normally supports the thin metal film, are preferably supplied in rolls that can be unwound into an in-line press. All of the other layers, including the electrodes, the electrolyte, the dielectric, and the adhesives as well as the graphic image, are preferably printed in patterns on one of the substrates by printing stations that are arranged along the press. Flexographic printing is preferred, but screen printing or other extrusion techniques may be required for printing the adhesives.

The thin metal films are preferably predeposited onto the substrates in advance of any press operations. However, a thin metal film could also be transfer printed from a temporary carrier onto the top substrate along the press, such as by hot or cold stamping. For example, a thin metal film could be transferred from the temporary carrier by cold stamping in a pattern that matches an adhesive pattern on the new substrate for shaping the electrodes.

Such in-line processing can be used to produce successions of interactive electrochemical display cells in large volumes at low cost. Additional stations, such as die cutters, laminators, or applicators, can be used to adapt the displays for their intended use, such as for game pieces and game cards.

We claim:

1. An interactive electrochemical display assembly comprising:
   first and second electrode layers interconnected by an ionically conductive pathway and an electronically conductive pathway;
   a graphic image obscured from view by said first electrode layer;
   a plurality of switches having open and closed states;
   said open states of the switches interrupting at least one of said ionically and electronically conductive pathways;
   said closed states of the switches completing portions of at least one of said ionically and electronically conductive pathways; and
   said switches being closable in a pattern that triggers an electrochemical reaction that erodes at least one portion of said first electrode layer and reveals at least one portion of said graphic image.

2. The display assembly of claim 1 in which said at least one conductive pathway is arranged as a logical network interrelating combinations of said open and closed states of the switches.

3. The display assembly of claim 2 in which said electronically conductive pathway is interrupted by at least two of said switches in series so that closing both of said switches is required to complete said electronically conductive pathway between the electrode layers.

4. The display assembly of claim 1 in which a first portion of a thin metal film forms at least a portion of said first electrode layer, and a second portion of the same thin metal film forms at least a portion of said electronically conductive pathway.

5. The display assembly of claim 4 in which one of said switches bridges said first and second portions of the thin metal film.

6. The display assembly of claim 5 in which another of said switches bridges said second portion of the thin metal film and said second electrode layer.

7. The display assembly of claim 1 in which each of said switches includes a pair of contacts and a switch arm, said pairs of contacts and both of said electrode layers are mounted on a common substrate, and said switch arms are mounted on different substrates.

8. The display assembly of claim 7 in which said switch arms include conductive layers for completing portions of the conductive pathways.

9. The display assembly of claim 8 in which said conductive layers of the switch arms have adhesive properties for permanently closing said switches.

10. The display assembly of claim 9 further comprising release layers covering said conductive layers of the switch arms for protecting said conductive layers prior to use.

11. The display assembly of claim 1 in which said ionically conductive pathway is formed at least in part by an electrolyte layer.

12. The display assembly of claim 11 in which said electrolyte layer overlaps said first and second electrode layers, said second electrode layer overlaps said first electrode layer, and said second electrode layer includes openings for exposing portions of said first electrode layer to the electrolyte layer for completing the ionically conductive pathway between the electrode layers.

13. The display assembly of claim 1 in which said first electrode layer is divided into different portions, said ionically conductive pathway is one of a plurality of ionically conductive pathways connecting said different portions of said first electrode layer to said second electrode layer, and said electronically conductive pathway is one of a plurality of electronically conductive pathways connecting said different portions of said first electrode layer to said second electrode layer.

14. The display assembly of claim 13 in which said ionically conductive pathways are physically separated from each other.

15. The display assembly of claim 13 in which said ionically conductive pathways also interconnect said different portions of said first electrode layer.

16. The display assembly of claim 1 in which said electrode layers have different electrode potentials.

17. An interactive compound display assembly comprising:
 a plurality of mounting pieces;
 a main substrate having prescribed locations for receiving said mounting pieces;
 said mounting pieces including portions of electrochemical display cells that undergo electrochemical reactions for changing between display states;
 said main substrate including remaining portions of said electrochemical display cells at said prescribed locations; and
 said mounting pieces being receivable in said prescribed locations on the substrate for changing the display states of the display cells.

18. The assembly of claim 17 in which said electrochemical display cells are voltaic cells.

19. The assembly of claim 18 in which said mounting pieces include a conductive adhesive for supporting flows of current through said display cells.

20. The assembly of claim 19 in which said mounting pieces also include a release layer for protecting said conductive adhesive prior to use.

21. The assembly of claim 20 in which said display undergoes an irreversible change between states in response to the flow of current.

22. The assembly of claim 17 in which each of said electrochemical display cells includes two electrode layers and an electrolyte layer.

23. The assembly of claim 22 in which each of said mounting pieces includes said electrolyte layer.

24. The assembly of claim 23 in which said electrolyte layer is formed by an electrolytic adhesive for bonding the mounting pieces to the prescribed locations on the substrate.

25. The assembly of claim 24 in which each of said mounting pieces also includes one of said electrode layers.

26. The assembly of claim 25 in which said electrode layer of the mounting pieces includes an opening for viewing the changes in the display states.

27. The assembly of claim 25 in which said mounting pieces also include an electronically conductive adhesive for completing an electronically conductive pathway between the electrode layers.

28. The assembly of claim 22 in which said substrate includes one of said electrode layers of the display cells at the prescribed locations.

29. The assembly of claim 28 in which the display cells share a common electrode layer on said substrate.

30. The assembly of claim 28 in which said substrate includes a graphics layer that is hidden by said one electrode layer at the prescribed locations.

31. The assembly of claim 30 in which said one electrode layer is erodable by the electrochemical reactions for revealing said graphics layer at the prescribed locations on the substrate.

32. A printed display assembly comprising:
 a plurality of mounting pieces;
 a substrate having prescribed locations for receiving said plurality of mounting pieces;
 at least one irreversible electrochemical display being layered on said substrate;
 at least one pair of switch contacts being layered on said substrate in said prescribed locations;
 a conductive pattern also being layered on said substrate interconnecting said electrochemical display with said switch contacts;
 each of said mounting pieces including a conductive medium for completing a conductive path through said switch contacts;
 said at least one irreversible electrochemical display supporting an electrochemical reaction for irreversibly changing between display states; and
 said at least one electrochemical display being arranged to irreversibly change between said display states in response to said mounting pieces being mounted in at least one of said prescribed locations on the substrate.

33. The assembly of claim 32 in which said conductive pattern provides a series connection between pairs of switch contacts for requiring more than one of said mounting pieces to be mounted in said prescribed locations for changing display states of said at least one display.

34. The assembly of claim 32 in which said conductive pattern provides a parallel connection between pairs of switch contacts and said at least one display for changing display states of said at least one display in response to mounting said mounting pieces in more than one of said prescribed locations.

35. The assembly of claim 32 in which said electrochemical display includes an electrode that is erodable for producing the irreversible change.

36. The assembly of claim 32 in which a graphic image is revealed by the erosion of the electrode.

37. An interactive electrochemical display assembly including three electrochemical cell layers, two of said electrochemical cell layers are electrode layers, one of said electrochemical cell layers is an electrolyte layer, and at least two of said electrochemical cell layers are mounted together on a common substrate; a graphic image is overlapped by one of said two electrode layers; and said two electrochemical cell layers are combined with a third of said electrochemical cell layers in a manner that completes an ionically conductive pathway between said two electrode layers and that initiates an electrochemical reaction that clears said overlapping electrode layer to reveal said graphic image.

38. The assembly of claim 37 in which said third electrochemical cell layer is said electrolyte layer.

39. The assembly of claim 38 in which said electrolyte layer is formed by an electrolytic adhesive.

40. The assembly of claim 39 further comprising a release layer that covers said electrolyte layer prior to combining with said two electrode layers.

41. The assembly of claim 37 in which said third electrochemical cell layer is one of said two electrode layers.

42. The assembly of claim 41 further comprising a conductive layer for electronically interconnecting said two electrode layers.

43. The assembly of claim 41 in which said third electrochemical cell layer is said overlapping electrode layer.

44. The assembly of claim 37 in which one of said two electrochemical cell layers is said overlapping electrode layer.

45. The assembly of claim 44 in which said graphic image is formed on said common substrate.

46. An interactive electrochemical display assembly comprising:
two electrode layers having different electrode potentials;
an ionically conductive pathway between said two electrode layers;
and electronically conductive pathway between said two layers;
one of said electrode layers overlapping a graphic image;
said two electrode layers and said two pathways being distributed between at least two disconnected substrates interrupting at least one of said two pathways; and
said two disconnected substrates being connectable for completing the interrupted pathway and for producing an electrochemical reaction that erodes said overlapping electrode and reveals said graphic image.

47. The assembly of claim 46 in which said ionically conductive pathway is formed by an electrolyte layer that is mounted on one of said substrates out of contact with at least one of said two electrode layers mounted on another of said substrates.

48. The assembly of claim 47 in which said electrolyte layer is mounted out of contact with both of said electrode layers.

49. The assembly of claim 46 in which said electrolyte layer is formed by an electrolytic adhesive for bonding the substrates together.

50. The assembly of claim 46 in which said electronically conductive pathway is divided between said disconnected substrates.

51. The assembly of claim 50 in which switch contacts of said electronically conductive pathway are mounted on one of said substrates, and switch arms for completing said electronically conductive pathway are mounted on another of said substrates.

52. The assembly of claim 50 in which said switch arms have adhesive properties for permanently closing said switches.

53. An interactive display cell comprising:
two electrode layers and a graphic image overlapped by one of said electrode layers;
an opening that exposes the two electrode layers for contact with an electrolyte; and
said display cell being activatable by adding the electrolyte through said opening and triggering an electrochemical reaction that clears said overlapping electrode layer to reveal said graphic image.

54. The display cell of claim 53 in which said overlapping electrode is oxidized in response to an electrochemical reaction supported by the electrolyte.

55. The display cell of claim 54 in which erosion of the electrode reveals said image.

56. The display cell of claim 53 in which said electrochemical display includes two electrodes that generate an electropotential in the presence of the electrolyte added through said opening in the substrate.

57. The display cell of claim 53 in which said electrolyte is safe for human consumption.

58. The display cell of claim 53 in which said two electrode layers are stacked together between top and bottom substrates, and said opening is formed through said top substrate.

59. The display cell of claim 58 in which said two electrodes are separated by a porous spacer in fluid communication with said opening through the top substrate.

60. The display cell of claim 59 in which said top substrate is transparent to provide a window for viewing said graphic image, and said graphic image is offset from said opening through the top substrate.

61. An interactive electrochemical display cell comprising:
two electrodes having different electrode potential and an electrolyte layer mounted on a common substrate;
a graphic image overlapped by one of said electrodes;
a pair of electrical contacts interrupting an electronically conductive pathway between said electrodes; and
said electrodes being exposed so that said common substrate can be folded together to complete the electronically conductive pathway in support of an electrochemical reaction that erodes said overlapping electrode and reveals said graphic image.

62. The display cell of claim 61 further comprising a conductive adhesive applied to one of said contacts.

63. The display cell of claim 62 further comprising a release layer covering said conductive adhesive.

64. A series of printed indicators made by an in-line process comprising:
a flexible web having a length;
a series of irreversible electrochemical displays that upon activation evolve from a first state to a second state;
a series of switches for activating said electrochemical displays; and
said electrochemical displays and said switches being printed in layers along said length of the web.

65. The indicators of claim 64 in which said electrochemical displays include first and second electrodes, ionically conductive pathways between said first and second electrodes, and electronically conductive pathways between said first and second electrodes.

66. The indicators of claim 65 in which said switches have open and closed states, said open states interrupting one of said ionically and electronically conductive pathways and said closed state completing one of said ionically and electronically conductive pathways for activating said electrochemical displays.

67. The indicators of claim 66 in which said switches are part of said ionically conductive pathways.

68. The indicators of claim 67 in which said open state of the switches confines electrolyte, and said closed state of the switches releases electrolyte for completing said ionically conductive pathways.

69. The indicators of claim 66 in which said switches are part of said electronically conductive pathways.

70. The indicators of claim 69 in which said electronically conductive pathways connect each of said electrochemical displays with more than one of said switches.

71. The indicators of claim 70 in which said electronically conductive pathways are logical networks relating combinations of said conductive states of the switches to the display states of the electrochemical displays.

72. The indicators of claim 65 in which one of said electrodes is eroded for providing the irreversible change between display states.

73. The indicators of claim 72 in which said one electrode is a thin film that is eroded to reveal a graphic image.

* * * * *